UNITED STATES PATENT OFFICE.

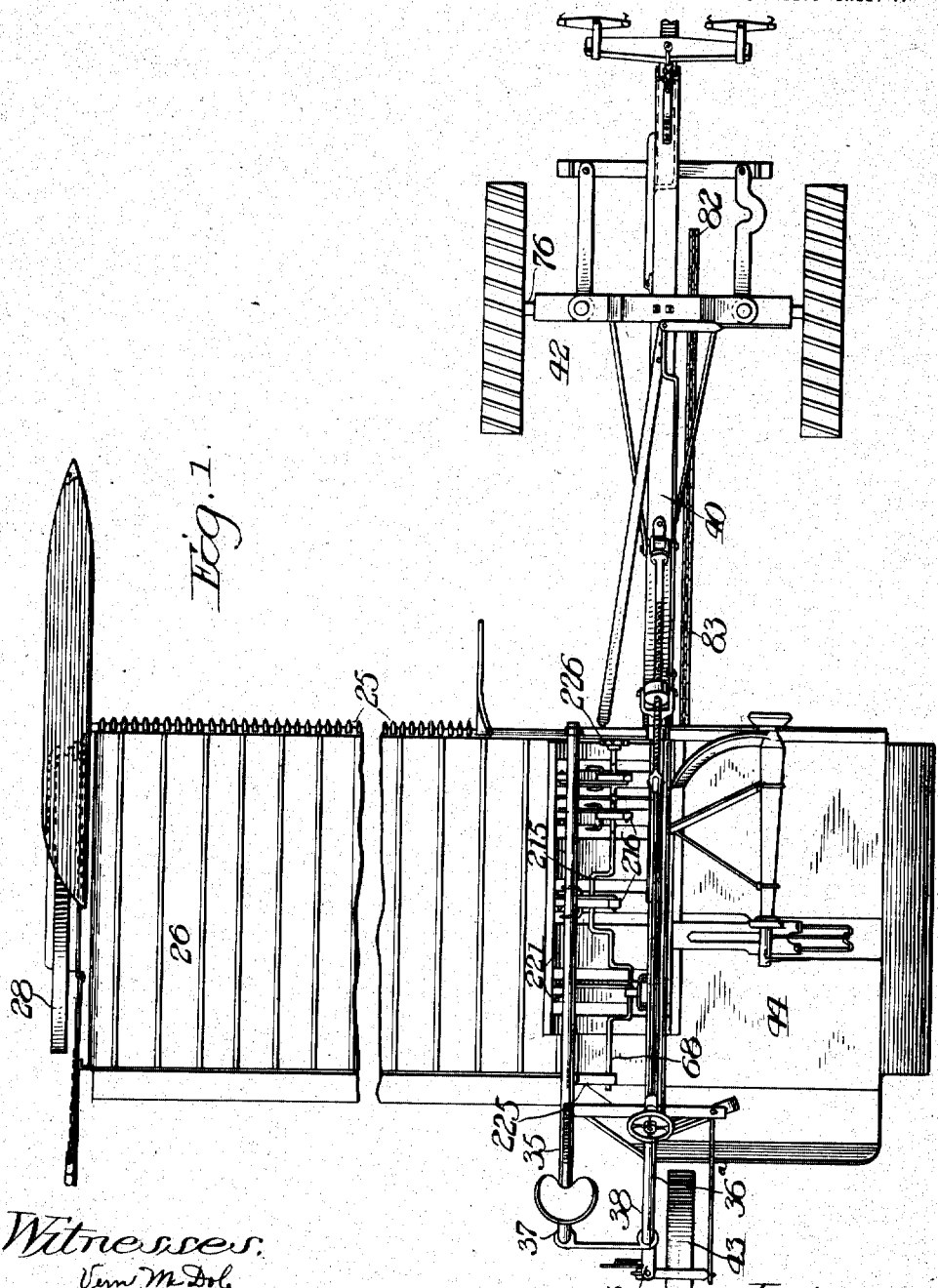

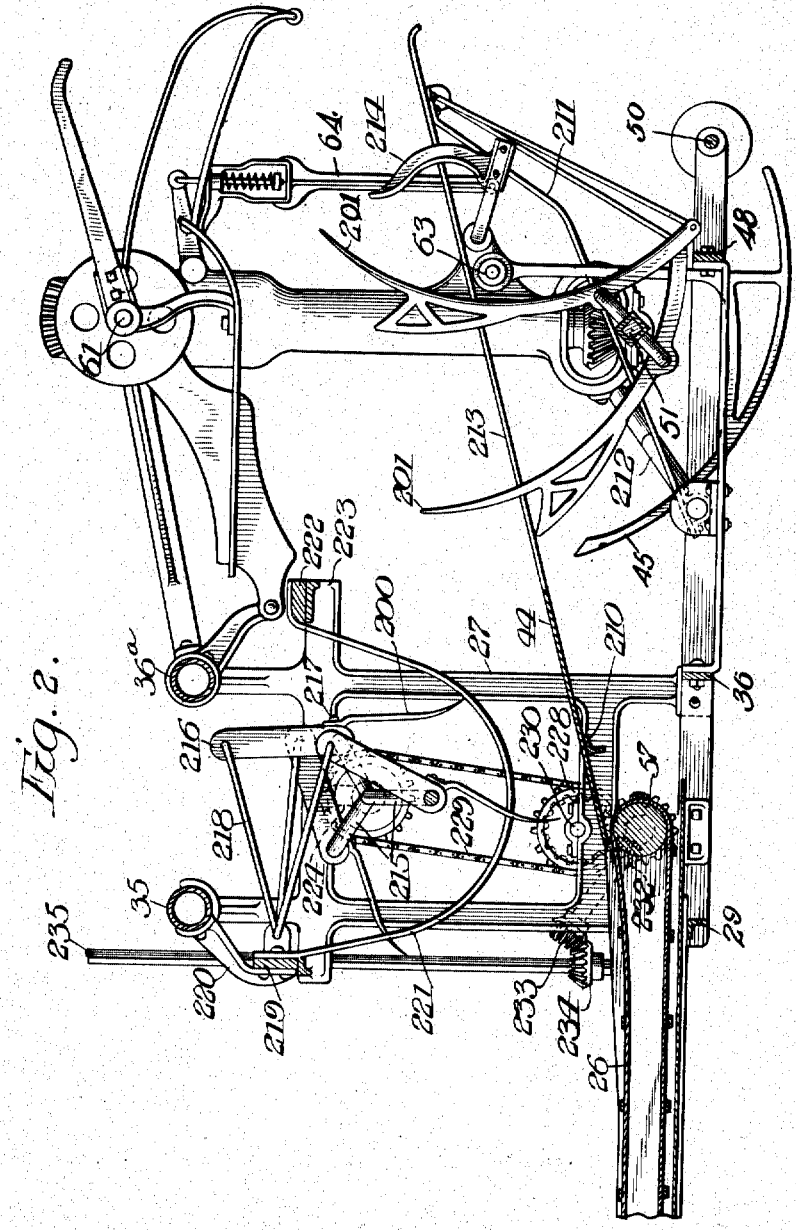

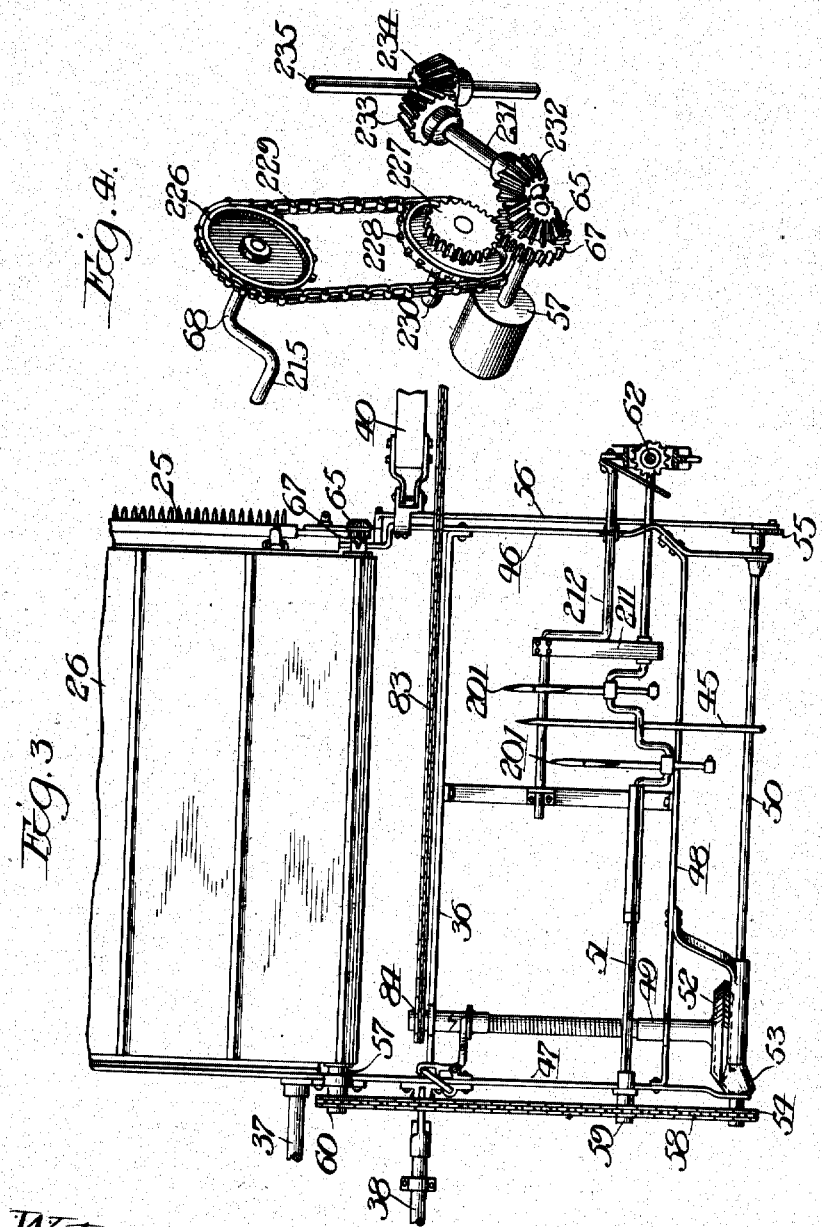

WALTER L. HENDRICKS, OF AURORA, ILLINOIS.

HARVESTING-MACHINE.

1,279,542.  Specification of Letters Patent. Patented Sept. 24, 1918.

Application filed October 13, 1913. Serial No. 794,880.

*To all whom it may concern:*

Be it known that I, WALTER L. HENDRICKS, a citizen of the United States, and resident of Aurora, county of Kane, and State of Illinois, have invented certain new and useful Improvements in Harvesting-Machines, of which the following is a specification, and which are illustrated in the accompanying drawings, forming a part thereof.

The invention relates to harvesting machines, and more particularly to those having provision for reaping grain and tying it into bundles.

The object of the invention is to provide a harvesting machine of simple and improved construction, and especially to reduce the height of the operative parts of such machines. The invention accordingly contemplates a harvesting machine having a deck or table upon which the grain is tied into bundles, with the receiving side or edge of this table located at substantially the same level with the parts which serve for cutting the grain.

In the accompanying drawings:—

Figure 1 is a plan view of a harvesting machine embodying the features of improvement provided by the invention;

Fig. 2 is a central transverse sectional view of the same;

Fig. 3 is a detail plan view with the binder deck removed, and showing some of the upright frame members in section; and Fig. 4 is a detail perspective view illustrating certain of the power-transmitting elements.

The operative parts of the machine are preferably supported by a front truck, generally designated 42, a rear carrying wheel 43, and a grain wheel 28, all as more fully appears in my application for patent on harvesting machines filed September 29th, 1913, Serial No. 792,301. These parts include the usual sickle bar 25, apron 26, and mechanism for tying the grain into bundles upon a deck or table 44. These parts are associated upon a horizontal frame comprising the front and rear transverse sills 46, 47, the longitudinal side sills 29 and 48, and the longitudinal intermediate sill 36. A stub tongue 40 extends forwardly from this frame, substantially in line with the rear carrying wheel 43, to the front truck 42.

In addition to the members already described, the frame comprises a pair of horizontally disposed bars 35 and $36^a$. These bars are located above the level of the sills, and have downwardly curved rear ends 37, 38. These connect with the rear sill 47. At their front ends the bars 35 and $36^a$ are connected with the front sill 46 through an upright bracket, generally designated 27 (Fig. 2).

Power for driving the operative parts of the machine may be derived from any convenient source. As shown, a sprocket wheel 82 is mounted on the axle, as 76, of the front truck 42, and a sprocket chain 83 turns over this sprocket wheel and over a second sprocket wheel 84 which is mounted on a countershaft 49. The countershaft 49 conveniently extends transversely through and is journaled in the intermediate sill 36 and side sill 48 adjacent the rear end of the frame. The rear carrying wheel 43 is secured to the downwardly turned rear end portion 38 of the bar $36^a$, as by means of a bracket which is generally designated 115. The grain wheel 28 is located at that side of the machine beyond the end of the sickle bar 25, and may be connected with the frame in any well known manner.

The apron 26 moves inwardly in rear of the sickle bar 25 in the usual way. At its inner end it turns over a driving roll 57. This roll extends between and is journaled at its opposite ends upon the front and rear sills 46 and 47.

In carrying out the invention the binder deck 44 is so mounted as to receive grain directly from the apron 26. As most clearly shown in Fig. 2, it is supported in a slightly inclined position, and has its inner edge substantially upon a level with the inner end of the apron. Any convenient means may be employed for supporting the deck 44. If desired it may rest upon a rail 210 and upon a bracket 211, the former extending rearwardly from the upright bracket 27 of the frame, and the latter being carried by the slide bar, as 212, of the binder mechanism.

The mechanism for tying the grain into bundles comprises the usual packers 201 and needle bar 45. These parts operate through slots, as 213, in the deck 44 in a well known manner. The shaft for operating the packers 201 is indicated at 51. The needle shaft is indicated at 63, and a knotter shaft 61 extends over the deck 44. These parts are operatively connected in the usual way, as through an upright shaft 62 which extends between the packer shaft 51 and knotter shaft 61, and a link 64 which extends between the knotter shaft 61 and needle shaft 63. The packers 201 serve for compressing the grain against a trip 214, for moving the same to set the knot-forming mechanism in motion in the usual way when a sufficient quantity of grain has accumulated for the formation of a bundle.

When the binder deck 44 is made of the width shown, a set of picker fingers 200 is desirably provided for moving the grain over this deck from the apron 26 to a point where it will be engaged by the packers 201. As shown, these picker fingers are all actuated by a single crank shaft 68. The picker fingers 200 are desirably arranged in pairs, each pair being formed from a single rod which is bent into the form of a fork.

The crank shaft 68 has a plurality of cranks 215, each crank serving for actuating a single pair of the picker fingers. As shown, the rod from which the picker fingers of each pair are constructed is secured against the lower end of a rocker arm 216, as by means of a bolt 217. Each of the cranks 215 of the crank shaft 68 extends through one of the rocker arms 216 adjacent its lower end.

The movement of the picker fingers 200 of each pair is controlled by a link 218, each of which extends between a longitudinal rail 219 of the frame and the higher end of the corresponding rocker arm 216. The rail 219 is conveniently supported in a position parallel with the crank shaft 68 by being secured to the bar 35 of the frame through brackets, one of which is shown at 220 (Fig. 2). Guide loops 221, extending between adjacent picker fingers 200, serve for preventing the grain from being lifted from the deck 44 during the upward movement of the picker fingers. These guide loops conveniently extend between and are secured at their opposite ends to the rail 219, and to a second rail 222, the latter being located in front of the crank shaft 68. The rail 222 may be supported in any convenient manner, as by securing one end of the same upon an arm 223 of the bracket 27.

The crank shaft 68 is preferably parallel with and substantially above the driving roll 57 of the apron 26. This crank shaft is shown as being supported by being journaled adjacent its opposite ends in a part 224 of the bracket 27, and in a bracket 225 (Fig. 1) which is carried by the bar 35. A sprocket wheel 226 is mounted upon the crank shaft 68 for driving the same.

The countershaft 49 serves for transmitting power to all of the operative parts. As shown, this countershaft is operatively connected with a longitudinal shaft 50 through beveled gears 52 and 53. The beveled gear 52 is mounted upon the countershaft 49. The beveled gear 53 is mounted on the longitudinal shaft 50. This shaft is located at that side of the machine which is remote from the grain wheel 28. It is conveniently supported in this position by being extended through and journaled in the front and rear sills 46, 47, adjacent its opposite ends. A crank disk 55 is mounted upon the forward end of the longitudinal shaft 50. This crank disk serves for actuating the sickle bar 25. For this purpose it is operatively connected with the sickle bar through a pitman 56.

A sprocket wheel 54 is mounted upon the rear end of the longitudinal shaft 50. This sprocket wheel is operatively connected with the driving roll 57 through a sprocket chain 58, which turns over the sprocket wheel 54 and over a second sprocket wheel 60 mounted upon the rear end of the roll 57. The sprocket chain 58 also engages a sprocket wheel 59, which is mounted upon the rear end of the packer shaft 51.

The remaining operative parts are driven through the roll 57. As shown, a beveled gear 65 and spur gear 67 are mounted upon that end of the roll which is remote from the sprocket wheel 60. The spur gear 67 serves for driving the crank shaft 68 to operate the picker fingers 200. To this end a pinion 227 meshes with the spur gear 67, and a sprocket wheel 228, which is formed integral with the pinion 227, serves to receive a sprocket chain 229 which also turns over the sprocket wheel 226. The pinion 227 and sprocket wheel 228 may be mounted in any convenient manner, as upon a stud 230 (Fig. 2) which is fixed in the bracket frame 27 and projects forwardly therefrom.

The beveled gear 65 serves for driving the usual reel (not shown). To this end a short intermediate shaft 231 is provided. This intermediate shaft has a beveled pinion 232, fixed upon one of its ends for meshing with the beveled gear 65, and a beveled pinion 233 fixed upon its other end for meshing with a beveled gear 234. The beveled gear 234 is mounted upon an upright spindle 235, which leads to the reel. The shaft 231 is conveniently supported in an oblique position, as by being extended through a bearing bracket (not shown), carried by the bracket frame 27.

No oscillating plate or blade, such as is usually employed for engaging the butt ends of the grain as they pass onto the binder deck, is shown in the drawings. While I have found that the machine operates very satisfactorily without the use of this part, it will be understood that it may be readily supplied if its use is desired.

The invention provides for tying the grain into bundles without the use of an elevator for raising it from the level of the apron 26 to an elevated binder deck. On the other hand, the grain passes directly through the machine and remains at all times on substantially the same level with the sickle bar 25.

I claim as my invention,—

In a harvesting machine, in combination, a plurality of carrying wheels one of which is a traction wheel, a sickle bar extending laterally outward from one side of the plane of the traction wheel, bundle forming mechanism including a flat deck on which grain cut by the sickle bar is received and tied into bundles and over an edge of which the completed bundles are discharged, the receiving edge of the said flat deck being substantially on a level with the sickle bar and the said edge of the deck over which the completed bundles are discharged being upon the remote side of the plane of the wheel which is most remote from the sickle bar, a horizontally movable traveling apron extending in rear of the sickle bar and delivering directly to the said receiving edge of the deck and a conveying reel acting over the said receiving edge of the deck.

WALTER L. HENDRICKS.

Witnesses:
JEAN McDOLE,
EDWARD SCHMIDT.

Copies of this patent may be obtained for five cents each, by addressing the "Commissioner of Patents, Washington, D. C."